Figure 1:
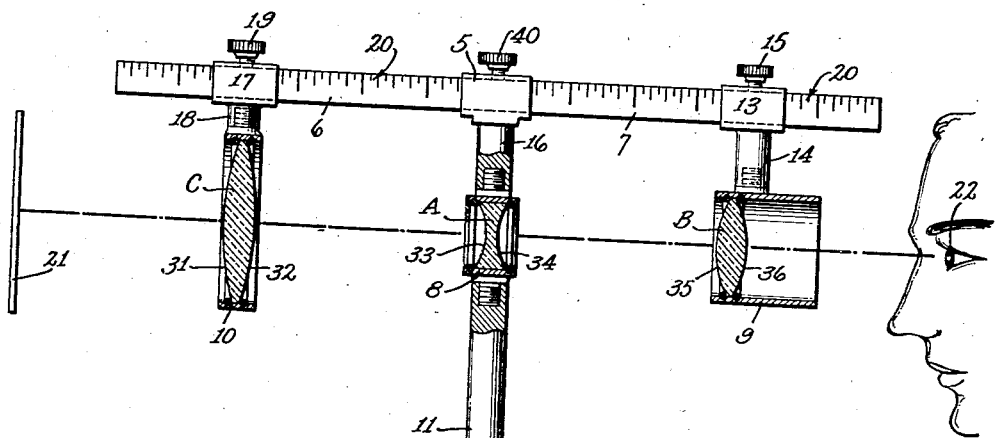

Aug. 15, 1939.                    C. H. STANLEY                    2,169,397
                                STEREOSCOPIC DEVICE
                                 Filed May 9, 1938

Inventor
Charles H. Stanley
By Everett N. Curtis
Attorney

Patented Aug. 15, 1939

2,169,397

UNITED STATES PATENT OFFICE 2,169,397

STEREOSCOPIC DEVICE

Charles H. Stanley, San Diego, Calif., assignor of one-third to Thomas Arthur Turner, San Diego, Calif.

Application May 9, 1938, Serial No. 206,828

6 Claims. (Cl. 88—29)

My invention relates to stereoscopic devices, and its objects are, to dispense with the necessity of the taking of two pictures of the observed object from different points of view; to obviate the use of binocular lenses in the production of three dimensional effects, and to secure such effects through a linear arrangement of lenses looked through with but one human eye alone; to afford a better means for the examination and interpretation of skiagraphs, photographs and other graphic representations; to bring about perception of depth and tactile values in the projection of motion pictures; to lessen eyestrain and to overcome individual defects and peculiarities of human vision; to produce stereoscopic effects in viewing a single roentgengram of any part of the human body or of living organisms; to secure three dimensional effects in observing X-ray pictures of any substance or thing, animate or inanimate; to increase or diminish or vary the apparent size of objects under observation in order to differentiate parts or to discover virtues or defects therein; to avoid, in the case of small or nervous children, the taking of more than one picture upon which to base stereoscopic observations; to dispense with the necessity of employing heavy and complicated apparatus, and in general to lessen cost of production and to simplify and render more convenient and effective the operation of the several parts entering into the combinations hereinafter set forth.

So far as I am aware there is not on the market today any lens apparatus capable of producing in the observation therethrough, a three dimensional effect of the object observed, without the employment of the usual arrangement of binocular lenses set at a slight angle for a person to observe with both eyes simultaneously, two views of the same object taken at the same slight angle. Heretofore it has been deemed necessary in order to secure stereoscopic effects, to take two photographs of an object to correspond with the normal distance apart of the human eyes, a distance arbitrarily assumed to be three inches, but which varies with every human being, so that it has been impossible to secure uniform results. Then again the character of vision of each human eye is usually different from the other eye, so that many human beings find it difficult if not impossible to obtain clear vision through a commercial stereoscope, and a person blind in one eye, obviously could not, with the remaining eye, utilize such apparatus at all.

I have discovered through a long course of experimentation that by the employment and proper adjustment of a double concave lens interposed between two double convex lenses, preferably all of which lenses are of different focal points, I am able through the observation of one eye only, to secure stereoscopic effects heretofore deemed impossible without the use of the aforesaid pictures taken at different angles and superimposed through binocular lenses correspondingly inclined. In my new instrument, either eye of a human person may be used to make the stereoscopic observation in a manner similar to looking through a microscope, although the arrangement of lenses in my device is of course quite different.

Attention is hereby directed to the drawing in which similar numerals of designation refer to similar parts throughout the several views, and in which,—

Figure 2:
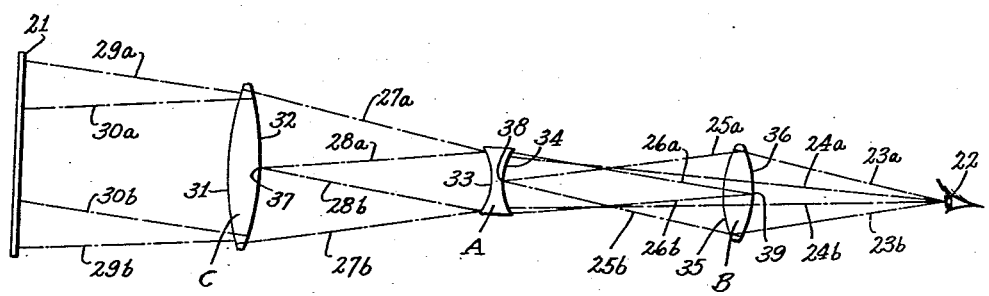

Figure 1 is a side elevation of my improved apparatus showing the lenses and adjacent parts in section; and Figure 2 is a diagrammatic view of the human eye lenses, object under observation, and rays producing the stereoscopic effects.

Referring to the drawing in which is illustrated one of the preferred forms of my improved apparatus, I employ a stand having a broad base 4, and a barrel 3, in the bore of which is inserted the upright rod 11, a thumb screw 12 serving to adjust the said rod at various heights to suit the convenience of the operator.

Secured to the top of said rod 11 is the circular lens holder 8 constructed to hold the double concave lens A, and firmly affixed to the depending arm 16 carrying the socket 5, the interior diameter of which is preferably square or rectangular in cross section, and is shaped to receive the tubes 6 and 7, the ends of which telescope therein, and are secured against displacement by the thumb screw 40. Each of the tubes 6 and 7 are preferably provided with a scale 20.

Mounted upon the tube 7, is the sliding sleeve 13, provided with the adjusting thumb screw 15, and the depending arm 14 supporting the circular lens holder 9, here shown in the form of short cylindrical eye piece and containing the double convex lens B. Similarly mounted upon the tube 6, is the sliding sleeve 17, likewise provided with an adjusting screw 19, and having a depending arm 16 carrying the circular lens holder 10, in which holder is mounted the double convex lens C. As will be observed, all of the lenses are open to ingress of light coming toward the faces thereof, and the spaces between the lenses are unlike the common telescope or microscope, in that they are in no way enclosed except in the immediate vicinity of the edges thereof.

Preferably all parts of my apparatus except the lenses, which are of the best ground glass, are constructed of metal or other suitable material. Preferably,—the double concave lens A is two inches in diameter, has its focal point at infinity, and is of −7.5 diopters; double convex lens B is two and one-half inches in diameter, has a focal point at 4 inches and is of +8.50 diopters; double convex lens C is four inches in diameter, has its focal point at twelve inches and is of +2.5 diopters.

In using my apparatus, I place the object of observation 21 in proper alinement with the lenses A, B and C, securing such alinement through the adjusting screw 12 and positioning of the base 4. Then in order to secure the best stereoscopic effects, I move the lenses B and C back and forth, away or toward the lens A until the desired position is secured; the lens B serving to obtain the desired focal point of observation, and the lens C serving to enlarge or diminish the apparent size of the object. Such desired position is graphically shown in Figure 2, in which, chiefly through the employment of the double concave lens A superimposed images are produced and the rays emanating therefrom are carried back to the human eye 22. In such figure, I have not attempted to reproduce all of the rays, direct or indirect required to produce my effects, but through designation of one of a class of rays, I have endeavored to indicate the velocities, emanations, distortions, and magnifications resulting in third dimensional vision.

Beginning at object 21, lines 29a and 29b are scattered rays emanated from outside surface of convex lens C numbered 31. These rays 29a and 29b produce or make the image visible to the eye 22, and are slightly reduced on the image reflecting back to the inner concave surface of lens C over rays 30a and 30b. This convex lens C straightens out the rays against the image, due to its convex surfaces 31 and 32. Due to the fact that lens A is double concave, rays 27a and 27b are scattered rays reflecting back to the concave portion 33 of lens A. Rays 28a and 28b are high velocity rays emanating from concave surface 33, making its focal point at 37 in lens C. This lens A, being double concave within itself, produces a third dimensional effect of the image; however, in and of itself it will not, without the use of the convex lenses, produce the fine detail desired. For example, by lens A alone, a minor fracture might not be readily observed. However, when lenses B and C are used, I am enabled to enlarge the image making it possible to observe the slightest fracture, with 90% stereoscopic effect. As rays 26a and 26b converge at the focal point 39 against the convex surface of lens B, the convex surface 36 of lens B through rays 25a and 25b gives a focal point on concave surface 34 at point 38. The image then travels back to the retina of the eye from lens A through lens B over rays 24a and 24b. The concave surface 34 of lens A reflects back against the retina of the eye 22 over rays 24a and 24b through lens B. The concave anterior portion of the ball socket of the eye is met with reflected light over rays 23a and 23b, comprising all lines of light rays between the retina and the object viewed. Consequently, with this combination of lenses I have produced curved rays that produce distorted images until the combined rays pass through lens C. After they pass through lens C, the light rays are straightened and produce the third dimension on the image viewed.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

What I claim and desire to secure by Letters Patent is,—

1. In an apparatus for producing stereoscopic effects, the combination of a stand, two double convex lenses mounted thereon, a single double concave lens mounted on said stand and lineally interposed between said lenses, and means for linear adjustment of said convex lenses in respect to said concave lens.

2. In an apparatus for producing stereoscopic effects, the combination of a support, two double convex lenses mounted thereon, a single double concave lens mounted upon said support and located between said lenses, all of said lenses being open and lineally disposed and having unenclosed spaces in between, and means for linear adjustment of said lenses in respect to each other.

3. In an apparatus for producing stereoscopic effects, the combination of a support, two double convex lenses with different focal points lineally mounted thereon, a single double concave lens with a focal point different from said focal points mounted upon said support and lineally interposed between said convex lenses, and means for linear adjustment of said lenses in respect to each other.

4. In an apparatus for producing stereoscopic effects, the combination of a stand, a double concave lens rigidly mounted thereon, an arm connected to said stand and located above said lens, and two double convex lenses slidably mounted upon said arm, with said concave lens lineally interposed therebetween, and with said convex lenses lineally adjustable in respect to said concave lens.

5. In an apparatus for producing stereoscopic effects, the combination of a stand, a double concave lens rigidly mounted thereon, an arm connected to said stand and located above said lens, and two double convex lenses slidably mounted upon said arm, with said concave lens lineally interposed therebetween, and with said convex lenses lineally adjustable in respect to said concave lens; all of said lenses having different focal points.

6. In an apparatus for producing stereoscopic effects, the combination of a support, two double convex lenses with different focal points lineally mounted thereon, a single double concave lens with a focal point different from said focal points mounted upon said support and lineally interposed between said convex lenses, and means for linear adjustment of said lenses in respect to each other; the said double concave lens having a focal point at infinity, and one of said double convex lenses having a focal point of approximately four inches, and the other a focal point of approximately twelve inches.

CHARLES H. STANLEY.